3,415,866
α-ALKYLIDENE-3,4-DISUBSTITUTED-
PHENYLACETONITRILES
John T. Suh, Mequon, Wis., assignor to Colgate-Palmolive Company, New York, N.Y., a corporation of Delaware
No Drawing. Filed Mar. 14, 1966, Ser. No. 533,826
4 Claims. (Cl. 260—465)

ABSTRACT OF THE DISCLOSURE

The compounds are α-alkylidene-3,4-disubstituted-phenylacetonitriles which are useful as intermediates in the synthesis of known aromatic hydroxylase inhibitors. A species disclosed is α-iso-propylidene-3,4-dimethoxyphenylacetonitrile.

The present invention relates to novel α-alkylidene-3,4-disubstituted-phenylacetonitriles having the formula

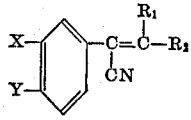

in which X and Y are hydroxy, lower alkoxy such as methoxy, ethoxy and propoxy, or aralkoxy such as benzyloxy, and $R_1$ and $R_2$ are the same or different lower alkyls of 1 to 4 carbon atoms.

The compounds of the present invention may be conveniently prepared by treating a 3,4-disubstituted phenylacetonitrile with a dialkyl ketone in the presence of a sodium alkoxide, such as sodium ethoxide, under reflux conditions.

This process may be diagrammed as follows:

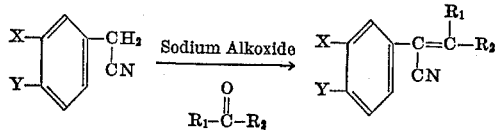

Among the 3,4-disubstituted phenylacetonitriles which may be employed are 3,4-dimethoxyphenylacetonitrile,
3,4-diethoxyphenylacetonitrile, and
3,4-dibenzyloxyphenylacetonitrile.

Illustrative of the ketones which may be employed are acetone,
methylethyl ketone,
diethyl ketone,
dipropyl ketone, and
methyl n-butyl ketone.

Representative of the novel compounds which can be prepared in the described manner are α-iso-propylidene-3,4-dimethoxyphenylacetonitrile,
α-iso-propylidene-3,4-dibenzyloxyphenylacetonitrile,
α-iso-propylidene-3,4-diethoxyphenylacetonitrile,
α-sec-butylidene-3,4-dimethoxypenylacetonitrile,
α-sec-butylidene-3,4-dibenzyloxyphenylacetonitrile, and
α-sec-butylidene-3,4-diethoxyphenylacetonitrile.

The compounds of the present invention are useful intermediates which may be reduced and employed in the synthesis of known aromatic hydroxylase inhibitors (see A. Carlsson et al., Helv. Chim. Acta, 46, 2271, 1963).

The following examples are presented to illustrate this invention:

Example 1.—α-Iso-propylidene-3,4-dimethoxyphenylacetonitrile

To a solution of 26.5 g. (1.15 g. atm.) of sodium in 1400 ml. of ethanol is added a slurry of 200 g. (1.13 mole) of 3,4-dimethoxyphenylacetonitrile in 300 ml. of ethanol. The solution is refluxed 2 hours and cooled to 25° and 142 g. (2.5 moles) of redistilled acetone added in 1 hour, after which it is stirred at 25° for 0.5 hour and refluxed 4 hours. Ethanol (1 liter) is then removed under reduced pressure and the residue cooled and diluted with 3.5 liters of water after which it is extracted twice with 1 liter portion of ether. The extracts are combined, washed with 500 ml. of brine, dried over anhydrous sodium sulfate and reduced in vacuo to yield an orange syrup which is fractionated to yield a colorless syrup which crystallizes upon standing. Recrystallization from ethanol and reduction of the mother liquor yields α-iso-propylidene-3,4-dimethoxyphenylacetonitrile in the form of a white crystalline solid, M.P. 97–98°.

Analysis.—Calcd. for $C_{13}H_{15}NO_2$: C, 71.86; H, 6.96; N, 6.45. Found: C, 71.92; H, 7.18; N, 6.31.

Example 2.—α-Iso-propylidene-3,4-dimethoxyphenylacetonitrile

To a solution of 12.9 g. (0.57 mole) of sodium in 700 ml. of ethyl alcohol is added 100 g. (0.57 mole) of 3,4-dimethoxyphenylacetonitrile and 38.8 g. (0.51 molr.) of acetone. The reaction mixture is allowed to reflux 1 hour, and then cooled and added to 3 liters of ice-water. The mixture is extracted with ether, the extracts dried, and the solvent distilled in vacuo to yield a viscous liquid. Unreacted 3,4-dimethoxyphenylacetonitrile (43.4 g.) is recovered by crystallization from isopropanol. The mother liquor is concentrated in vacuo and the residue fractionated to yield α-iso-propylidene-3,4-dimethoxyphenylacetonitrile in the form of a clear viscous liquid, B.P. 120–127°/0.04 mm., which crystallizes upon cooling, M.P. 97–98°.

Analysis.—Calcd. for $C_{13}H_{15}NO_2$: C, 71.86; H, 6.96; N, 6.45. Found: C, 71.92; H, 7.18; N, 6.81.

Example 3.—α-Iso-propyl-3,4-dimethoxyphenylacetonitrile

To a solution of 21.7 g. (0.1 mole) of α-iso-propylidene 3,4-dimethoxyphenylacetonitrile in 280 ml. of ethanol is added 0.75 g. of 10% palladium on carbon and the mixture is shaken with hydrogen (43.3 p.s.i.) until the theoretical amount of hydrogen (8.2 p.s.i.) has been taken up in 5 hours. The catalyst is removed by filtration and the filtrate reduced in vacuo to yield a clear syrup which crystallizes upon standing. It is recrystallized from ethanol to yield α-iso-propyl-3,4-dimethoxyphenylacetonitrile in the form of a white crystalline solid, M.P. 45.5–49°.

Analysis.—Calcd. for $C_{13}H_{17}NO_2$: C, 71.18; H, 7.83; N, 6.39. Found: C, 71.13; H, 7.73; N, 16.53.

Example 4.—α-Iso-propyl-3,4-dimethoxyphenylacetamide

To a solution of 2.1 g. (0.05 ml.) of sodium hydroxide in 4.4 ml. of water is added 5.5 g. (0.025 mole) of α-isopropyl-3,4-dimethoxyphenylacetonitrile dissolved in 70 ml. of methanol. Hydrogen peroxide (13.1 ml., 30%) is then added dropwise in 10 minutes and the solution stirred for 16 hours at room temperature. The reaction mixture diluted with 300 ml. of water and cooled. The solid product is collected and recrystallized from 40% aqueous ethanol to yield α-iso-propyl-3,4-dimethoxyphenylacetamide in the form of a white crystalline solid, M.P. 145–146°.

*Analysis.*—Calcd. for $C_{13}H_{19}NO_3$: C, 65.79; H, 8.07; N, 5.90. Found: C, 65.61; H, 8.10; N, 6.07.

I claim:
1. A compound of the formula

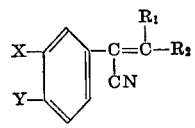

in which X and Y are methoxy, ethoxy, propoxy or benzyloxy, and $R_1$ and $R_2$ are lower alkyl of 1 to 4 carbon atoms.

2. A compound of claim 1 having the formula

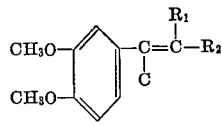

in which $R_1$ and $R_2$ are lower alkyls of 1 to 4 carbon atoms.

3. A compound of claim 1 having the formula

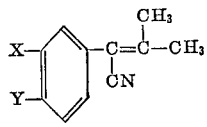

in which X and Y are methoxy or benzyloxy.

4. A compound of claim 1 having the formula

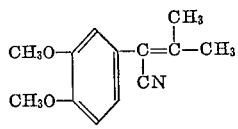

References Cited

UNITED STATES PATENTS 3,132,176  5/1964  Bollinger et al. ____ 260—465 X

OTHER REFERENCES

Migrdichian, Organic Synthesis, volume I, pp. 212–214.

Carlsson et al.: Helvetica Chimica Acta, vol. 46, No. 6. pp. 2271–85, 1963.

CHARLES B. PARKER, *Primary Examiner.*

S. T. LAWRENCE III, *Assistant Examiner.*

U.S. Cl. X.R.

167—65

UNITED STATES PATENT OFFICE
CERTIFICATE OF CORRECTION

Patent No. 3,415,866 December 10, 1968

John T. Suh

It is certified that error appears in the above identified patent and that said Letters Patent are hereby corrected as shown below:

Column 3, lines 23 to 29, the formula should appear as shown below:

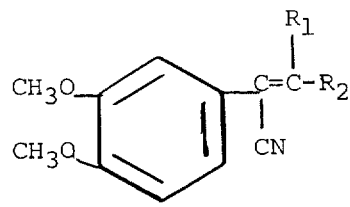

Signed and sealed this 24th day of March 1970.

(SEAL)
Attest:

Edward M. Fletcher, Jr.

Attesting Officer

WILLIAM E. SCHUYLER, JR.

Commissioner of Patents